(12) United States Patent
Katoh

(10) Patent No.: US 8,951,681 B2
(45) Date of Patent: Feb. 10, 2015

(54) LITHIUM ION BATTERY WITH CATALYTIC MATERIAL

(75) Inventor: Takashi Katoh, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 465 days.

(21) Appl. No.: 12/383,048

(22) Filed: Mar. 19, 2009

(65) Prior Publication Data

US 2009/0239152 A1 Sep. 24, 2009

(30) Foreign Application Priority Data

Mar. 19, 2008 (JP) ................. 2008-070702

(51) Int. Cl.
*H01M 4/40* (2006.01)
*H01M 6/32* (2006.01)
*H01M 4/92* (2006.01)
*H01M 6/34* (2006.01)

(52) U.S. Cl.
CPC ...... *H01M 6/32* (2013.01); *H01M 4/40* (2013.01); *H01M 4/92* (2013.01); *H01M 6/34* (2013.01); *H01M 2300/0071* (2013.01); *Y02E 60/50* (2013.01)
USPC ........................................ 429/402; 429/403

(58) Field of Classification Search
USPC ............ 429/209, 231.95, 319, 322, 403, 304, 429/246, 402
See application file for complete search history.

(56) References Cited

U.S. PATENT DOCUMENTS

2007/0122715 A1* 5/2007 Fujino et al. .................. 429/251
2008/0268327 A1* 10/2008 Gordon et al. .................. 429/50

FOREIGN PATENT DOCUMENTS

| EP | 1 088 796 | * | 4/2001 | ............. C03C 10/02 |
|---|---|---|---|---|
| JP | 2002-100398 | A | 4/2002 | |
| JP | 2007-066703 | A | 3/2007 | |
| JP | 2007-513464 | | 5/2007 | |
| JP | 2007-329107 | A | 12/2007 | |
| WO | WO 2005/038953 | | 4/2005 | |

* cited by examiner

*Primary Examiner* — Ula C. Ruddock
*Assistant Examiner* — Frank Chernow
(74) *Attorney, Agent, or Firm* — Fox Rothschild LLP

(57) ABSTRACT

To solve a problem that in a battery having a negative electrode having a capability of releasing a metal ion, a positive electrode for causing a liquid such as water or seawater to contribute to battery reaction, and an inorganic solid electrolyte, the inorganic solid electrolyte contacts the positive electrode for a long term, whereby a deterioration is generated from the interface between the electrolyte and the positive electrode so that the battery capacity falls or the battery cannot give a high power. The positive electrode and the inorganic solid electrolyte are not brought into contact with each other. Preferably, the interval between the positive electrode and the electrolyte is set to 0.3 nm or more.

17 Claims, 8 Drawing Sheets

LITHIUM ION BATTERY WITH CATALYTIC MATERIAL

CROSS REFERENCES TO RELATED APPLICATIONS

The present application claims priority under 35 U.S.C. §119 from Japanese Patent Application No. 2008-070702 filed with the Japan Patent Office on Mar. 19, 2008, the entire contents of which are incorporated herein by reference.

BACKGROUND OF THE INVENTION

1. Field of the Invention

The present invention relates to a battery, and more specifically to a battery having a negative electrode having a capability of releasing a metal ion, a positive electrode for causing a liquid such as water or seawater to contribute to battery reaction, and an inorganic solid electrolyte.

2. Description of the Related Art

Batteries as described above are disclosed, for example, as lithium/water batteries in Patent Document 1 described below. Such a battery has a structure composed of a negative electrode (made of, for example, Li metal), a protective layer, a solid electrolyte, and a positive electrode. In general, the positive electrode is constructed to hold an active material, such as water or seawater, and a liquid which functions also as an electrolyte, and is further made of a material for reducing and decomposing the liquid.

The solid electrolyte is, for example, an inorganic solid electrolyte having metal-ion conductivity.

Such a structure has a problem that when the inorganic solid electrolyte contacts the positive electrode for a long term, a deterioration is generated in the interface between the inorganic solid electrolyte and the positive electrode so that the battery capacity comes to fall or the battery comes to be unable to give a high power.

Patent Document 1: International Patent Application Japanese National Publication No. 2007-513464

SUMMARY OF THE INVENTION

In light of the above-mentioned problem, an object of the present invention is to provide a battery having an inorganic solid electrolyte which does not deteriorate, thereby making it possible to solve the problem, which is a fall in the battery performance caused by deterioration in the inorganic solid electrolyte due to the contact thereof with a positive electrode.

In light of the above-mentioned problem, the inventors have repeatedly made eager investigations, to find out that in a case where a battery is constructed in the state that its positive electrode and its inorganic solid electrolyte do not contact each other, the battery has a high reliability, and the inorganic solid electrolyte does not deteriorate. In this manner, the present invention has been made. The specific configuration of the battery is as follows:

(1) A battery comprising a positive electrode, a negative electrode having a capability of releasing a metal ion, and an inorganic solid electrolyte, wherein the positive electrode does not contact the inorganic solid electrolyte.
(2) The battery according to item (1), wherein an interval between the positive electrode and the inorganic solid electrolyte is 0.3 nm or more.
(3) The battery according to item (1) or (2), which has a spacer material between the positive electrode and the inorganic solid electrolyte.
(4) The battery according to item (1) or (2), which has a porous material between the positive electrode and the inorganic solid electrolyte.
(5) The battery according to item (4), wherein a porosity of the porous material is from 50 to 99%.
(6) The battery according to item (1) or (2), which contains no spacer material between the positive electrode and the inorganic solid electrolyte.
(7) The battery according to any one of items (1) to (6), wherein the positive electrode has a capability of reducing and decomposing oxygen and/or water.
(8) The battery according to any one of items (1) to (7), wherein the positive electrode has a porous body or mesh capable of holding a liquid electrolyte or causing the liquid electrolyte to flow, or a laminate of the porous body and the mesh.
(9) The battery according to any one of items (1) to (8), wherein the positive electrode has a porosity of 20 to 99.5%.
(10) The battery according to any one of items (1) to (9), wherein the positive electrode has a catalytic material having a capability of reducing and decomposing oxygen and/or water, and a current collecting unit having electron conductivity.
(11) The battery according to item (10), wherein at least a part of the current collecting unit of the positive electrode is coated with a metal.
(12) The battery according to item (10) or (11), wherein the current collecting unit of the positive electrode comprises a seawater-resistant alloy.
(13) The battery according to any one of items (10) to (12), wherein the catalytic material of the positive electrode is made of fine particles having an average particle diameter of 10 μm or less.
(14) The battery according to any one of items (10) to (12), wherein the catalytic material of the positive electrode is made of fine particles having an aspect ratio of 2 or more.
(15) The battery according to any one of items (1) to (9), wherein the positive electrode contains a catalytic material having a capability of reducing and decomposing oxygen and/or water, and the catalytic material has electron conductivity.
(16) The battery according to any one of items (1) to (15), wherein the positive electrode has a thickness of 10 μm or more.
(17) The battery according to any one of items (1) to (16), wherein the negative electrode contains lithium metal.
(18) The battery according to any one of items (1) to (17), wherein the inorganic solid electrolyte contains a crystal of $Li_{1+X+Z}M_X(Ge_{1-Y}Ti_Y)_{2-X}P_{3-Z}Si_ZO_{12}$ where $0<X\leq0.6$, $0.2\leq Y<0.8$, $0<Z\leq1$, and M=Al or Ga.

According to the invention, a battery can be obtained in which an inorganic solid electrolyte does not deteriorate so that the battery performance does not fall.

DESCRIPTION OF THE PREFERRED EMBODIMENTS

Figure 1:
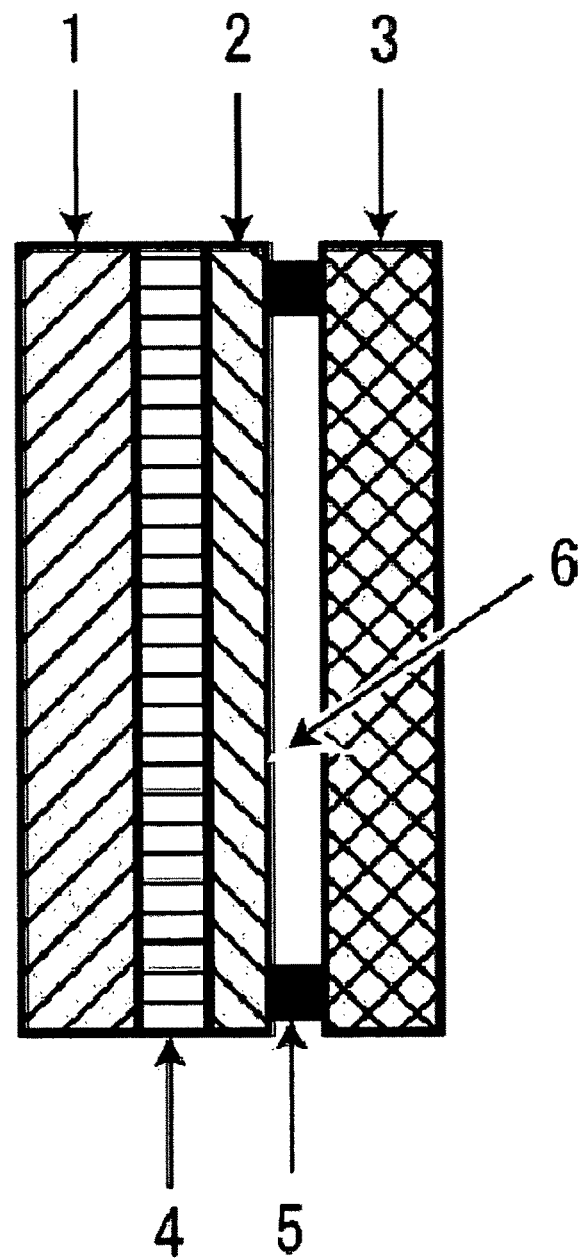
FIG. 1 is a schematic view illustrating a structure of a battery according to the invention.

The present invention will be described in detail hereinafter. The battery of the invention may have a structure illustrated in FIG. 1. The battery illustrated in FIG. 1 has a positive electrode 3, a negative electrode 1 having a capability of releasing a metal ion, and an inorganic solid electrolyte 2, and the positive electrode 3 does not contact the inorganic solid electrolyte 2. In the case of bringing the positive electrode and the inorganic solid electrolyte into noncontact with each other in this way and holding a liquid functioning as both of an active material and an electrolyte therebetween, the inorganic solid electrolyte can be prevented from deteriorating.

The battery of the invention is a product which generates battery reaction upon supply of the liquid, which functions as both of an active material and an electrolyte; however, even in a case where the battery does not have any liquid functioning as both of an active material and an electrolyte, it is defined as a "battery". The battery of the invention may be produced, circulated, stored or transported in the state that no liquid functioning as both of an active material and an electrolyte is supplied into the battery. As the need arises, a liquid functioning as both of an active material and an electrolyte may be supplied to the battery of the invention when the battery is used.

The interval between the inorganic solid electrolyte and the positive electrode is preferably 0.3 nm or more, more preferably 20 nm or more, and most preferably 50 nm or more in order to prevent a deterioration of the inorganic solid electrolyte effectively. In order to make the battery size as small as possible to maintain the energy density high, or to make the discharge current density higher, the interval between the inorganic solid electrolyte and the positive electrode is preferably 100 mm or less, more preferably 80 mm or less, and most preferably 50 mm or less.

The interval between the inorganic solid electrolyte and the positive electrode means the shortest distance between the inorganic solid electrolyte and the positive electrode. This interval is varied depending on the capacity of the negative electrode inside the battery, the structure of the battery, and the member structure of the battery, and thus, the interval is not necessarily 100 mm or less.

In order to bring the inorganic solid electrolyte and the positive electrode into noncontact with each other as described above, it is advisable that as illustrated in FIG. 1, for example, the battery is caused to have a spacer material 5 between the inorganic solid electrolyte and the positive electrode and a liquid functioning as both of an active material and an electrolyte is held between the inorganic solid electrolyte and the positive electrode. The liquid may be held by sealing the periphery of the space between the inorganic solid electrolyte and the positive electrode entirely with the spacer material. Alternatively, by causing the spacer material to be partially present between the solid electrolyte and the positive electrode, the liquid may be held by effect of surface tension of the liquid itself, or be held by surrounding the constituting members of the battery partially or entirely with a material which does not contribute to the battery reaction. The spacer material is preferably a material having a low reactivity with both of the inorganic solid electrolyte and the positive electrode material. Examples thereof include water-insoluble resins, ceramics, amorphous materials, and composite materials each made of two or more selected therefrom.

Figure 2:
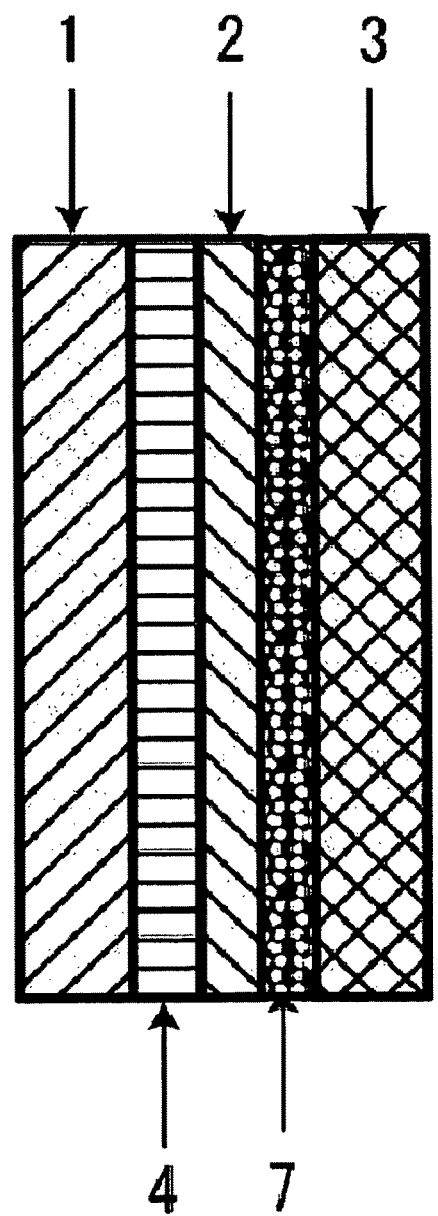
FIG. 2 is a schematic view illustrating a structure of the battery according to the invention.

As illustrated in, for example, FIG. 2, another aspect for bringing the inorganic solid electrolyte 2 and the positive electrode 3 into noncontact with each other may have a porous material 7 between the inorganic solid electrolyte and the positive electrode. In this case, a liquid functioning as both of an active material and an electrolyte is held in the porous material. This porous material is also preferably a material having a low reactivity with the inorganic solid electrolyte and the positive electrode material in the same manner as the spacer material. Examples thereof include porous resin films, porous ceramics, ceramic fiber clothes, and glass fiber clothes. The lower limit of the porosity of the porous material is preferably 50%, more preferably 55%, and most preferably 60% since a good battery reaction may be hindered if the material has a small liquid-holding amount. The upper limit of the porosity of the porous material is preferably 99%, more preferably 98%, and most preferably 97% in order for the porous material to have a strength required as a spacer.

Figure 3:
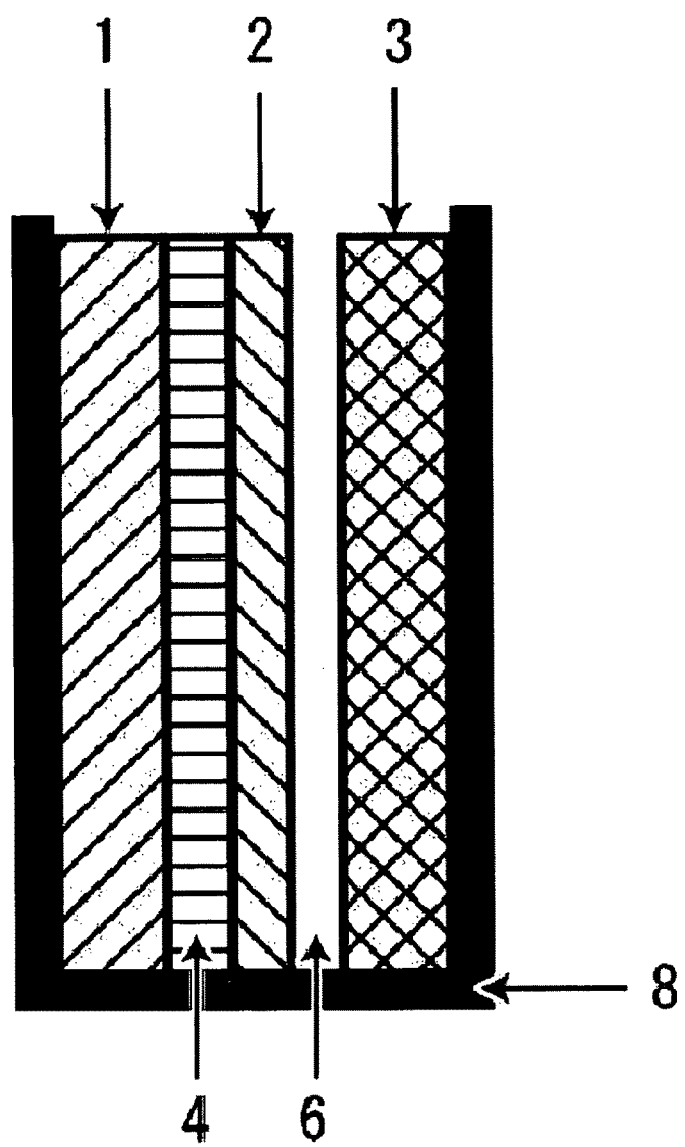
FIG. 3 is a schematic view illustrating a structure of the battery according to the invention.

As illustrated in, for example, FIG. 3, still another aspect for bringing the inorganic solid electrolyte 2 and the positive electrode 3 into noncontact with each other may have a structure in which the positive electrode 3 and the negative electrode 1 are each supported by a supporter, a protective film 4 is optionally jointed to the negative electrode 1, and the inorganic solid electrolyte 2 is jointed to the negative electrode 1 or the protective film 4. In this case, the supporter is constructed as a container, thereby holding easily a liquid functioning as both of an active material and an electrolyte. In order to attain battery reaction reliably between the positive electrode and the negative electrode, the supporter is preferably made of a material which does not contribute to the battery reaction. Examples thereof include resins having corrosion resistance, electric non-conductance, and high strength, such as PEEK polyetheretherketone) and PP (polypropylene), glass, austenite stainless steel, and a product obtained by subjecting the steel to electrically insulating treatment.

When Li metal is used as the negative electrode active material and water is used as the liquid functioning as both of an active material and an electrolyte in the battery of the invention, it appears that the following battery reaction is caused:

Li+H$_2$O=LiOH+1/2H$_2$, or

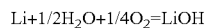
Li+1/2H$_2$O+1/4O$_2$=LiOH

Reactions on the negative electrode side and the positive electrode side can be represented, respectively, as follows:

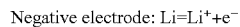
Negative electrode: Li=Li$^+$+e$^-$

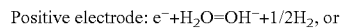
Positive electrode: e$^-$+H$_2$O=OH$^-$+1/2H$_2$, or

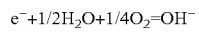
e$^-$+1/2H$_2$O+1/4O$_2$=OH$^-$

In order to activate the battery reaction to provide a battery giving a high power, the positive electrode desirably has a capability of reducing and decomposing water or oxygen to promote the shift of electrons to water or oxygen.

In the battery of the invention, the liquid therein functions as both of an active material and an electrolyte; therefore, the positive electrode preferably has a structure for holding this liquid or causing the liquid to flow. Specifically, the positive electrode preferably has a porous body, a mesh, or a laminate made of a porous body and a mesh. In order for the positive electrode to hold the liquid easily or cause the liquid to flow easily to advance the battery reaction in the positive electrode smoothly, the lower limit of the porosity of the positive electrode is preferably 20%, more preferably 30%, and most preferably 40%. The upper limit of the porosity of the positive electrode is preferably 99.5%, more preferably 99%, and most preferably 98% in order for the positive electrode to have a strength for resisting the application of pressure to the inside of the battery.

In order for the positive electrode to have a capability of reducing and decomposing water or oxygen, it is advisable that the positive electrode has a catalytic material. The catalytic material may be, for example, Ni, Pt, Pd, Ru or Au. In order to complete the battery, the positive electrode further needs to have a current collecting function. Therefore, the positive electrode is preferably made into a structure (i) having a current collecting unit and the catalytic material, or a structure (ii) having a catalytic material having electron conductivity, whereby the catalytic material itself has the current collecting function.

Figure 4:
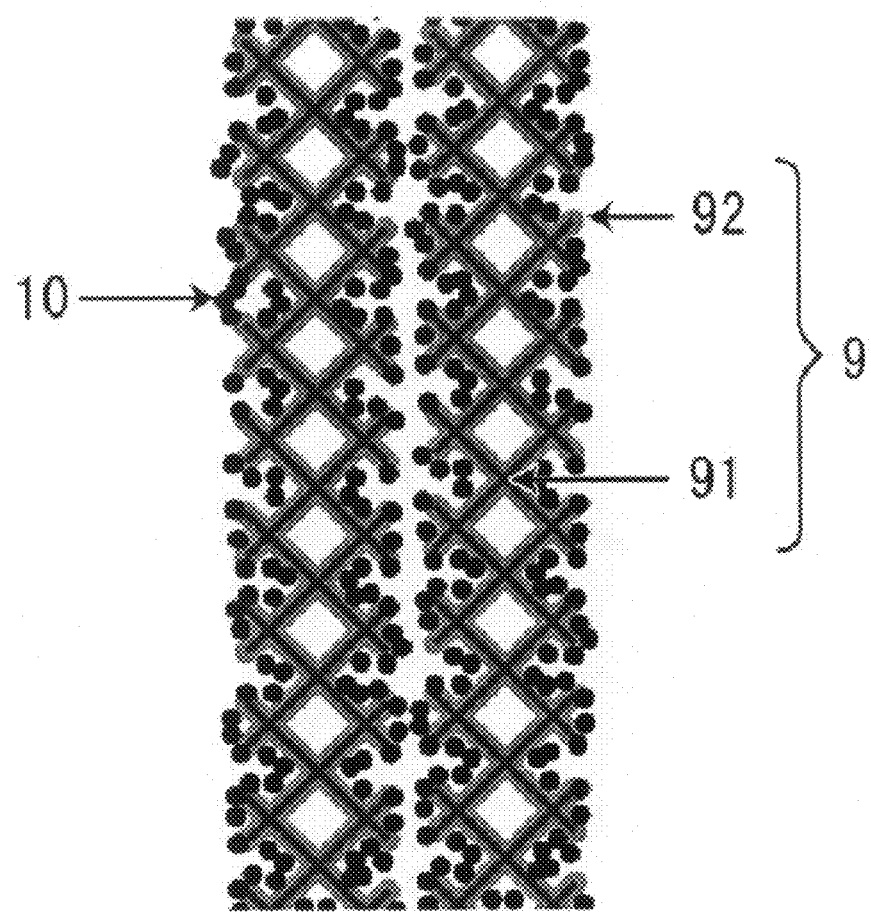
FIG. 4 is a schematic view illustrating a structure of a positive electrode of the battery according to the invention.

FIG. 4 is a view illustrating an aspect of the structure (i). In FIG. 4, a current collecting unit 9 is made of a skeleton material 91, and at least a part thereof is coated with a metal 92. Furthermore, the current collecting unit is partially coated with a catalytic material 10. By coating at least a part of the current collecting unit with the metal in this way, the positive electrode can have a current collecting function. In the case of using seawater as the liquid functioning as both of an active material and an electrolyte, it is preferred that the current collecting unit is not easily corroded with seawater. It is therefore advisable to use an inexpensive, seawater-resistant nonmetallic material as the skeleton material and use a seawater-resistant metal as the coating metal. In the present specification, the word "coated" denotes "being coated with a film" or "being coated with a large number of grains".

Figure 5:
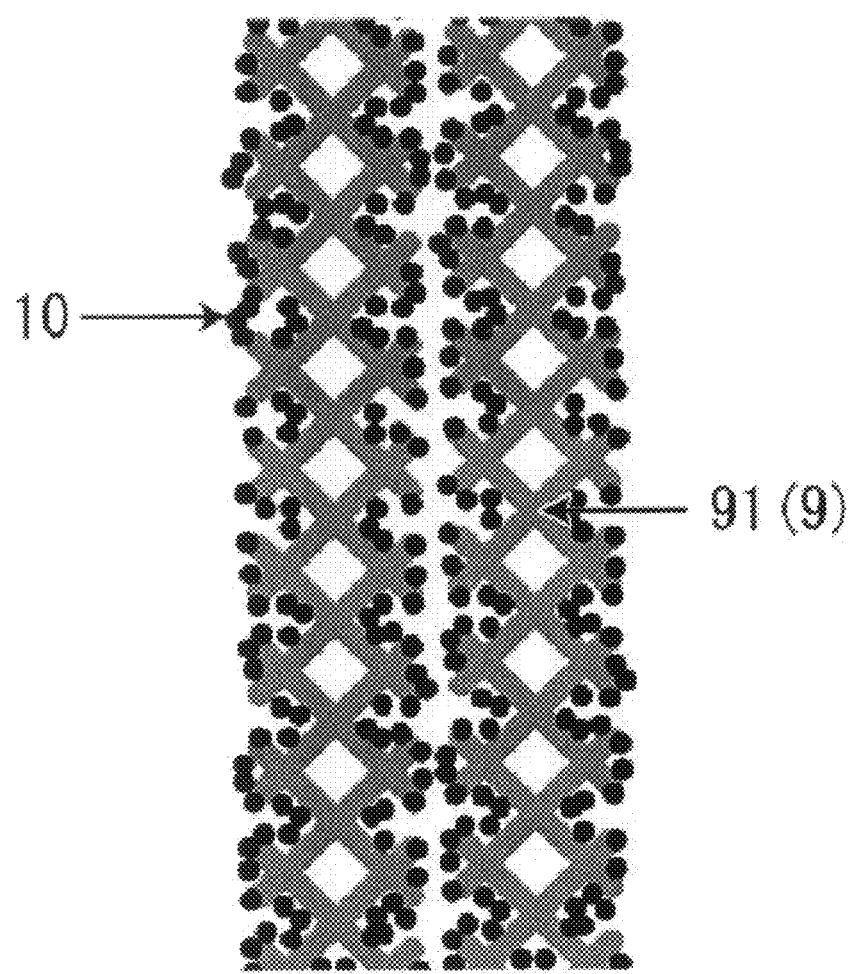
FIG. 5 is a schematic view illustrating a structure of the positive electrode of the battery according to the invention.

FIG. 5 is still another aspect of the structure (i) In FIG. 5, a current collecting unit 9 (91) has a skeleton made of a seawater-resistant alloy, and the skeleton itself has a current collecting function. Furthermore, the current collecting unit is partially coated with a catalytic material 10. The seawater-resistant alloy may be, for example, an alloy in which P, Si, Cu, Cr, Mo or the like is added to Fe, stainless steel (SUS 312), or INCONEL (registered trade name) or INCOLOY (registered trade name), which is an alloy in which Cr, Fe, Mo or the like is added to Ni. In a case where a seawater-resistant alloy itself can be processed into a porous or mesh form, the construction of the positive electrode according to the present aspect gives a good production efficiency.

In the structure (i), the catalytic material containing Ni, Pt, Pd, Ru or Au is preferably in the form of fine particles in order to have a large surface area to give an effective catalytic effect. The upper limit of the average particle diameter thereof is preferably 10 μm, more preferably 7 μm, and most preferably 5 μm. The lower limit of the average particle diameter is preferably made as small as possible as long as the limit value is a technically possible value.

As the average particle diameter, the following values are used: in measurement by the sedimentation method, a value measured as the diameter of a sphere equivalent in sedimentation velocity to a particle; and in the laser scattering method, a value measured as the diameter of a sphere equivalent in scattering property to a particle. The distribution of particle diameters is particle size (particle diameter) distribution. In the particle diameter distribution, when the total of the volumes of particles having a larger particle diameter than a certain particle diameter occupies 50% of the total volume of all particles, the certain particle diameter is defined as the average particle diameter D50. This is described in, for example, JIS Z 8901 "Powder for Test and Particles for Test", the first chapter in "Basic Physical Properties of Powder", edited by the Society of Powder Technology, Japan (ISBN4-526-05544-1), and various other documents. In the invention, a laser scattering type measuring device (LS100 model, or N5 model manufactured by Beckman Coulter BmbH) is used to measure the cumulative frequency distribution of particle diameters in terms of volume. For reference, the distribution in terms of volume is equal to that in terms of weight. In this cumulative frequency distribution, the particle diameter corresponding to 50% volume is obtained, and is used as the average particle diameter D50. In the present specification, the average particle diameter of particles is based on the median (D50) in the particle size distribution measured through a particle size distribution measuring means by the above-mentioned laser scattering method.

The catalytic material may be made of particles having an aspect ratio of 2 or more as well as the material may be made of substantially spherical particles. By making the material into such a shape, the material serves to hold the liquid functioning as both of an active material and an electrolyte and attain the formation of channels of the liquid and further have a large surface area to give an effective catalytic effect easily. In order to give the advantageous effects easily, the aspect ratio is preferably 2 or more, more preferably 3 or more, and most preferably 4 or more.

In the catalytic material, more advantageous effects are produced by making the specific surface area of the positive electrode large by use of fine particles; therefore, as for the linear diameter of the particles, the smaller the better. Thus, the aspect ratio is preferably 100 or less, more preferably 90 or less, and most preferably 80 or less. The aspect ratio is obtained as follows: a particle is sandwiched between two parallel straight lines along various directions; when the distance between the two lines is maximum, the distance is represented by D; when the distance therebetween is minimum, the distance is represented by d; the ratio of D/d is calculated; about the particle and other particles, the number (n) of which is 30 or more, the average of the ratios of D/d is calculated; and the resultant is defined as the aspect ratio.

Figure 6:
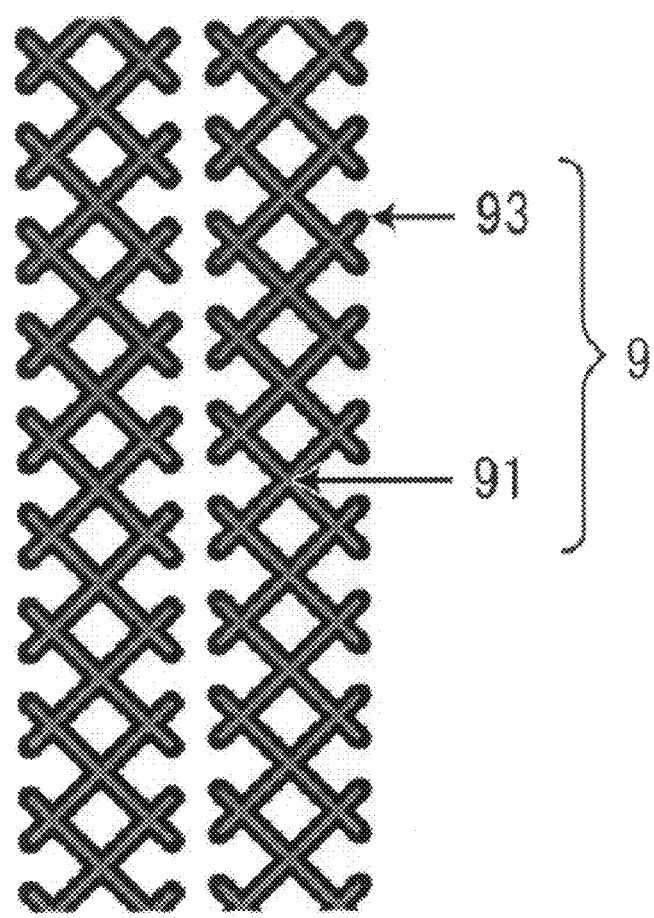
FIG. 6 is a schematic view illustrating a structure of the positive electrode of the battery according to the invention.

FIG. 6 illustrates an aspect of the structure (ii). In FIG. 6, a current collecting unit 9 is made of a skeleton material 91, and at least a part thereof is coated with a catalytic material 93 having electron conductivity. When the catalytic material itself is caused to have a current collecting function in this way, the production of the battery can be made effective. Since Au, Pt, Ni or some other catalytic material has seawater resistance, it is preferred to use such a catalytic material to attain the coating.

When the surface form of the catalytic material used for coating is made into a needle form, the surface area thereof is made large so that the material can favorably give catalytic effect effectively.

Figure 7:
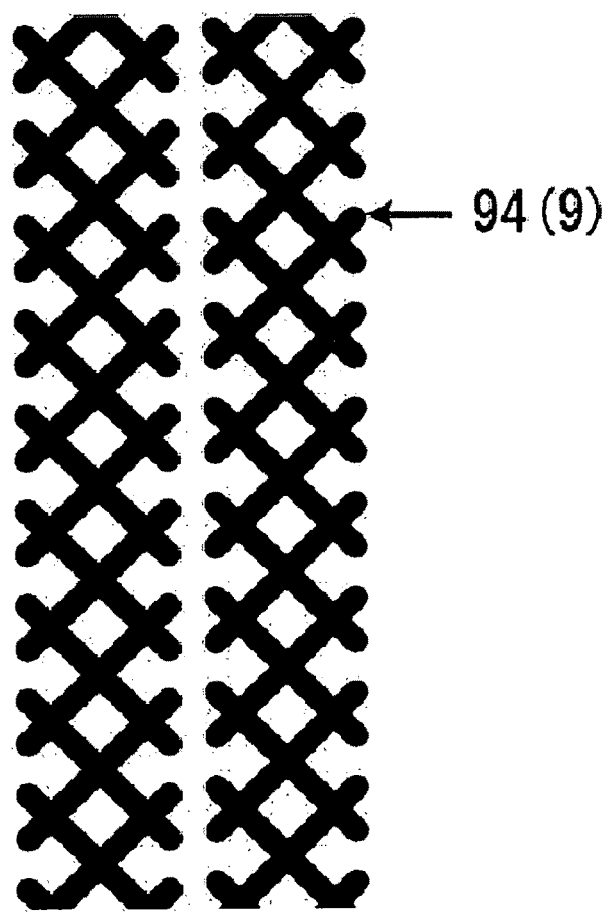
FIG. 7 is a schematic view illustrating a structure of the positive electrode of the battery according to the invention.

FIG. 7 is a view illustrating an aspect of the structure (ii). In FIG. 7, a current collecting unit 94(9) has a skeleton made of a catalytic material, and the skeleton itself acts as a catalyst and further has a current collecting function. By causing the skeleton itself to act as a catalyst and further have a current collecting function in this way, the production can be made efficient. Since Au, Pt, Ni or some other catalytic material has seawater resistance, it is preferred to use such a catalytic material.

In the positive electrode having the above-mentioned structure in the invention, the lower limit of the thickness thereof is preferably 10 μm, more preferably 20 μm, and most preferably 30 µm in order for the positive electrode to hold the liquid functioning as both of an active material and an electrolyte in a sufficient amount to make the electrode reaction area large. The upper limit of the thickness is preferably 20 mm, more preferably 10 mm, and most preferably 5 mm since liquid fluidity is required inside the electrode in order to promote the battery reaction.

The negative electrode in the battery of the invention is preferably made of metallic lithium or a lithium alloy since the output energy per unit volume can be made large. The thickness of the lithium metal or lithium alloy is preferably 0.02 mm or more, more preferably 0.03 mm or more, and most preferably 0.05 mm or more.

The inorganic solid electrolyte in the invention may be, for example, $Li_3N$, a LISICON, a crystal having a perovskite structure having lithium-ion conductivity such as $La_{0.55}Li_{0.35}TiO_3$, $LiTi_2P_3O_{12}$ having a NASICON structure, or LiPON. In order for the electrolyte to have a high lithium-ion conductivity and be chemically stable against water or seawater, preferred is a material containing a crystal of $Li_{1+X+Z}M_X(Ge_{1-Y}Ti_Y)_{2-X}P_{3-Z}Si_ZO_{12}$ where $0<X\leq0.6$, $0.2\leq Y<0.8$, $0<Z\leq1$, and M=Al or Ga.

For example, glass ceramic having a crystal phase of $Li_{1+X+Z}M_X(Ge_{1-Y}Ti_Y)_{2-X}P_{3-Z}Si_ZO_{12}$ where $0<X\leq0.6$, $0.2\leq Y<0.8$, $0<Z\leq1$, and M=Al or Ga is advantageous since the ceramic has voids or crystal boundaries which hinder ion conductivity in an amount of almost none or in a very slight amount.

The glass ceramic can be obtained by preparing a glass containing individual components described below, and then subjecting the glass to thermal treatment at 600 to 1000° C. for 1 to 24 hours, thereby precipitating a crystal from the glass phase.

$Li_2O$: 10 to 25%,
$Al_2O_3$ and/or $Ga_2O_3$: 0.5 to 15%,
$TiO_2$ and/or $GeO_2$: 25 to 50%,
$SiO_2$: 0 to 15%, and
$P_2O_5$: 26 to 40%, wherein these proportions are each represented by a percentage by mol in the whole of oxides. This amount-representing manner on the basis of the whole of oxides means the following: it is assumed that oxides, nitrates and others that are used as raw materials of the constituting components of the glass are wholly decomposed and turned into oxides when the glass is melted; the proportion of each of the components contained in the glass is represented by a percentage by mole in the whole of the turned oxides.

The inorganic solid electrolyte in the invention may be the glass ceramic that is made into a bulk form, or a product produced by making the glass ceramic into a powder form, molding the powder together with a binder or the like into a thin plate form, and then sintering the thin plate.

As the need arises, a protective film is laid between the negative electrode and the inorganic solid electrolyte. This protective film is laid to prevent reaction between the negative electrode and the inorganic solid electrolyte. The protective film may be made of a material selected from the materials described in Patent Document 1 (International Patent Application Japanese National Publication No. 2007-513464), such as LIPON having lithium-ion conductivity, and a gel electrolyte containing an organic electrolytic solution.

The protective film may be formed by, for example, a method described in Patent Document 1.

In order to prevent the reaction between the negative electrode and the inorganic solid electrolyte, the lower limit of the thickness of the protective film is preferably 0.002 µm, more preferably 0.005 µm, and most preferably 0.01 µm. If the protective film is too thick, the lithium-ion conductivity lowers; thus, the upper limit of the thickness is preferably 50 µm, more preferably 40 µm, and most preferably 30 µm.

The liquid functioning as both of an active material and an electrolyte preferably has lithium-ion conductivity, and may be a nonaqueous electrolytic solution, ionic liquid or aqueous solution of an electrolyte in which a lithium-supporting salt is dissolved.

Considering high ion conductivity and the fact that water is involved in the battery reaction, preferred is an aqueous solution of an electrolyte which has lithium-ion conductivity. Examples of this aqueous electrolyte solution include an aqueous solution or seawater in which a supporting salt such as $LiBF_4$, $LiPF_6$, $LiClO_4$, LiOH, $LiClO_4$ or LiTFSI is dissolved; and an aqueous solution having lithium-ion conductivity, such as an aqueous solution of KOH or $NH_4Cl$.

EXAMPLES

The battery of the invention will be described by way of specific examples hereinafter. However, the invention is not limited to the examples, and an appropriate modification is included in the scope of the invention as long as the modification does not change the subject matter of the invention.

Example 1

[Formation of an Electrolyte Substrate]

As raw materials, the following were used: $H_3PO_4$, $Al(OH)_3$, and $Li_2CO_3$ manufactured by Nippon Chemical Industrial Co., Ltd.; $SiO_2$ manufactured by Nitchitsu Co., Ltd.; $TiO_2$ manufactured by Sakai Chemical Industry Co., Ltd.; $GeO_2$ manufactured by Sumitomo Metal Mining Co., Ltd.; and $ZrO_2$ manufactured by Nippon Denko. These were weighed to set the composition thereof as follows: $P_2O_5$=37.5%, $Al_2O_3$=7.5%, $Li_2O$=14.5%, $SiO_2$=1.3%, $TiO_2$=17.5%, $GeO_2$=20.2%, and $ZrO_2$=1.5% wherein each of the symbols "%" herein denotes % by mol. The components were mixed into a homogeneous state. Thereafter, the components were put into a platinum crucible, and then heated and melted in an electric furnace. At this time, the starting material was first decomposed at 700° C. to vaporize $CO_2$ and $H_2O$ components. Next, the remaining material was heated to 1400° C., and melted at the temperature for 1.5 hours. Thereafter, the melted glass was cast onto an iron plate warmed in advance to produce a homogeneous glass plate. In order to remove strain from the glass plate, the plate was annealed at 520° C. for 2 hours. The thus obtained glass plate was cut into a size of 25 mm×25 mm. Both surfaces thereof were polished, and then the glass plate was thermally treated at 900° C. for 12 hours to yield a dense glass ceramic. According to a powder X-ray diffraction method, the crystal phase precipitated therein was identified as $Li_{1+X+Z}M_X(Ge_{1-Y}Ti_Y)_{2-X}P_{3-Z}Si_ZO_{12}$ where $0<X\leq0.6$, $0.2\leq Y<0.8$, $0<Z\leq1$, and M=Al or Ga. The glass ceramic exhibited a high conductivity of $1.1\times10^{-4}$ S·cm$^{-1}$ at 25° C.

[From the Formation of a Negative Electrode to the Formation of an Electrolyte Substrate]

Figure 8:
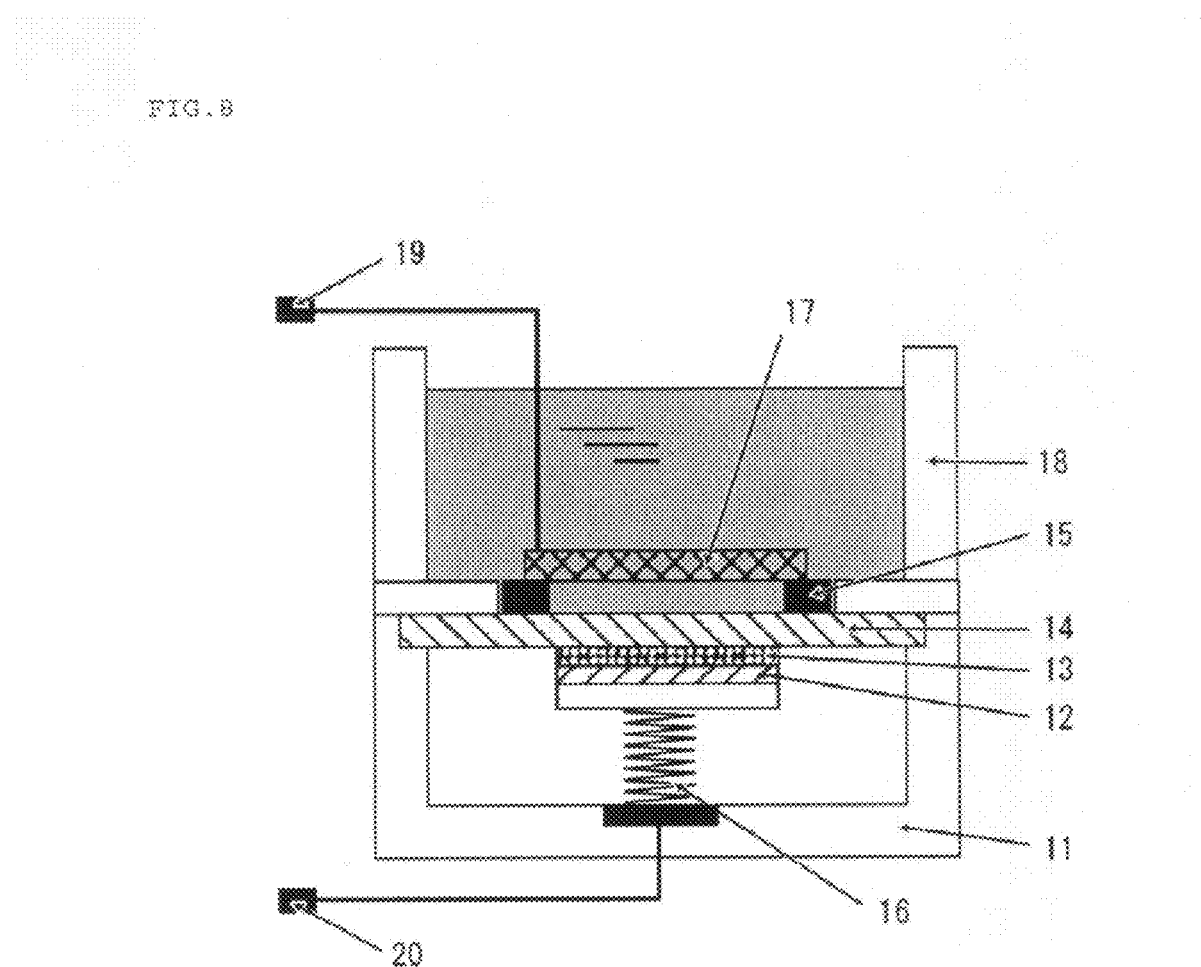
FIG. 8 is a schematic view illustrating the structure of a battery of Example 1 according to the invention.

FIG. 8 is a schematic view illustrating the structure of a battery of the present example. A Li—Al alloy foil 12 (manufactured by Honjo Metal Co., Ltd., content by percentage of Al: 0.1% by weight) having a diameter of 11 mm and a thickness of 0.2 mm was set as a negative electrode into a test battery 11 (having a container made of PTFE, and a negative electrode lead made of SUS304). A Pvdf finely porous membrane 13, 30 µm in thickness, into which an organic electrolytic solution (manufactured by Tomiyama Pure Chemical Industries, Ltd.; ratio by volume of EC/DEC=1/1, LiPF$_6$: 1 M) was incorporated, was put onto the negative electrode, and further a lithium-ion conductive glass ceramic 14, 0.2 mm in thickness, was laminated thereon to give a structure in which the Li—Al alloy foil 12, the finely porous membrane 13 and the glass ceramic 14 were successively arranged. Thereafter, the test battery was sealed. The test battery had a mechanism for pushing the Li—Al alloy foil toward the glass ceramic with a 0.2-kgf spring 16, and an opening of 20 mm diameter in the glass ceramic surface opposite to the Li—Al alloy foil, and further the test battery made the following possible: a container 18 capable of storing a liquid is set over the opening; and when a discharge test is made, an aqueous solution having lithium-ion conductivity, and others are put into the container.

[Formation of a Battery]

Next, a doughnut-shaped PTFE spacer 15 having a thickness of 10 mm and an opening of 15 mm diameter was arranged on the surface having the opening of 20 mm diameter, and a nickel porous body 17 (thickness: 1.6 mm, diameter: 16 mm, porosity: 70%) was put as a positive electrode onto the spacer 15. An SUS304 wire was used to pull out a positive lead 19.

Example 2

A battery was formed in the same way as in Example 1 except that the following were laminated onto each other: a doughnut-shaped PTFE having a thickness of 5 mm and an opening of 15 mm diameter, as a spacer; and a Ni mesh (thickness: 0.1 mm, diameter: 16 mm, line diameter: 0.05 mm, mesh size: 100 mesh/inch), as a positive electrode.

Example 3

A battery was formed in the same way as in Example 1 except that a doughnut-shaped PTFE having a thickness of 2 mm and an opening of 15 mm diameter was used as a spacer, and further a Pt mesh (thickness: 0.14 mm, diameter: 16 mm, line diameter: 0.07 mm, mesh size: 100 mesh/inch) was used as a positive electrode.

Example 4

A battery was formed in the same way as in Example 1 except that a batteryulose porous membrane having a thickness of 1 mm and a porosity of 65% was used as a spacer, a SUS304 mesh (thickness: 0.1 mm, line diameter: 0.05 mm, mesh size: 200 mesh/inch) was used as a skeleton material, and a product obtained by coating both surfaces of this SUS304 mesh with Pt by sputtering was used as a positive electrode.

Example 5

A battery was formed in the same way as in Example 4 except that a product obtained by coating a SUS304 mesh with Ni by electroless plating was used as a positive electrode.

Example 6

A battery was formed in the same way as in Example 1 except that a spacer and a positive electrode was formed by forming Ni coat on one surface of an aluminum porous plate (porosity: 70%, thickness 2 mm) by sputtering, and then laminating the aluminum porous plate on the electrolyte substrate while an aluminum surface, which is the other surface of the aluminum porous plate without having Ni coat, faces the electrolyte substrate. In the present example, the single surface of the aluminum porous plate functioned as the skeleton material of the positive electrode.

Example 7

A battery was formed in the same way as in Example 1 except that a slurry in which Ni powder (average particle diameter: 3 µm), a binder (BM-500) and water were mixed with each other was painted on a single surface of an aluminum porous plate (porosity: 70%, thickness: 2 mm) and then dried to form a positive electrode having a thickness of 110 µm and a porosity of 55%. In the present example, the single surface of the aluminum porous plate functioned as the skeleton material.

Example 8

A battery was formed in the same way as in Example 1 except that quartz glass fiber filters (porosity: 67%) were stacked on each other to form a spacer of 5 mm thickness, and Ni in the form of needles (bottom face diameter: 0.4 µm, length: about 1 µm) was precipitated onto a SUS304 mesh by electroless plating, so as to coat the mesh with Ni, thereby forming a positive electrode.

Example 9

A battery was formed in the same way as in Example 8 except that an ETFE mesh (line diameter: 0.08 mm, porosity: 43%) was coated with Ni by electroless plating, and further a slurry in which Ni powder (average particle diameter: 3 µm), a binder (BM-500) and water were mixed with each other was painted thereon and dried to form a positive electrode having a thickness of 1.8 mm and a porosity of 52%.

Example 10

A battery was formed in the same way as in Example 1 except that a PTFE porous membrane having a thickness of 55 µm and a porosity of 60% and subjected to hydrophilicity-imparting treatment was used as a spacer, and the same Ni porous body as used in Example 1 was used as a positive electrode.

Example 11

A battery was formed in the same way as in Example 1 except that: ion plating was used to form an aluminum nitride thin film on a single surface of the same Pt mesh (diameter: 16 mm, line diameter: 0.07 mm, mesh size: 100 mesh/inch) as used in Example 3; and the formed aluminum nitride coat surface was put onto the solid electrolyte of the test battery and a Pt mesh (diameter: 16 mm) was set thereon. In the present example, the aluminum nitride film functioned as a spacer.

The thickness of the aluminum nitride film formed on the quartz substrate at the same time when the Pt mesh was formed was measured. As a result, the thickness was 230 nm.

Example 12

A battery was formed in the same way as in Example 1 except that: a single surface of a perforated current collector (49 holes of 1 mm diameter were made in an INCOLOY (registered trade name) 825 material having a size 15 mm square and a thickness of 1 mm) was coated with Pt by sputtering, thereby forming a positive electrode; and the formed positive electrode was set over the solid electrolyte of the test battery 2 mm apart therefrom, whereby the positive electrode and the solid electrolyte were brought into noncontact with each other without setting up any spacer.

Example 13

A battery was formed in the same way as in Example 1 except that: a slurry in which Ni powder in the form of needles (width: 0.2 μm, length: 1 μm, aspect ratio: 5), a binder (BM-500) and water were mixed with each other was painted on an NSSC 270 plate manufactured by Nippon Steel & Sumikin and having a size 15 mm square and a thickness of 1 mm, and then dried to form a catalytic layer having a thickness of 2.6 mm, thereby forming a positive electrode; and the formed positive electrode was set over the solid electrolyte of the test battery 20 mm apart therefrom, whereby the positive electrode and the solid electrolyte were brought into noncontact with each other without setting up any spacer.

Comparative Example 1

A battery was formed in the same way as in Example 1 except that the solid electrolyte substrate and the Ni porous body contacted each other without setting up any spacer.

Comparative Example 2

A battery was formed in the same way as in Comparative Example 1 except that: a Pt thin film was formed on an aluminum substrate (diameter: 15 mm, thickness: 1 mm) by sputtering, thereby forming a positive electrode; and the Pt surface contacted the solid electrolyte.

[Discharge Test]

Into the container of the battery produced in each of Examples 1 to 9 and Comparative Example 1 was charged 100 cc of an aqueous $LiBF_4$ solution having a concentration of 0.5 M, and then the resultant was allowed to stand still for 12 hours. Moreover, into the container of the battery produced in each of Examples 10 and 11 and Comparative Example 2 was charged 100 cc of an artificial seawater (Marine Art SF-1 manufactured by Tomita Pharmaceutical Co., Ltd.), and then the resultant was allowed to stand still for 2 hours. Thereafter, each of the batteries was discharged at a constant current (2 mA) and a constant voltage (1.5 V) for 10 minutes. Thereafter, the battery was subjected to a discharge test at a current of 0.5 mA until a terminal voltage of 1.5 V was gained.

[Test Results]

The test results of Examples 1 to 11 and Comparative Examples 1 and 2 are together shown in Table 1. In each of Examples 1 to 13, which was produced without bringing its solid electrolyte and its positive electrode into contact with each other, 90% or more of the capacity of its Li negative electrode was discharged, and thus a high discharge capacity was exhibited.

In Comparative Example 1, which was produced by bringing its solid electrolyte and its positive electrode into contact with each other, and Comparative Example 2, only low capacities were exhibited, which were 56% of the discharge capacity of the Li negative electrode and 25% thereof, respectively. In Comparative Examples 1 and 2, the surface of the solid electrolyte after the test was discolored and deteriorated.

TABLE 1

| | Spacer/Interval between positive electrode and solid electrolyte | Positive electrode | | | Capacity |
|---|---|---|---|---|---|
| | | Skeleton material | Material taking charge of current collecting function | Catalytic material | |
| Example 1 | PTFE/10 mm | Ni porous body | ← | ← | 96% |
| Example 2 | PTFE/5 mm | Ni-mesh | ← | ← | 96% |
| Example 3 | PTFE/2 mm | Pt-mesh | ← | ← | 95% |
| Example 4 | Cellulose porous membrane/1 mm | SUS304-mesh | SUS304-mesh Pt coat | Pt coat | 94% |
| Example 5 | Cellulose porous membrane/1 mm | SUS304-mesh | SUS304 Ni coat | Ni coat | 95% |
| Example 6 | Alumina porous plate/2 mm | Alumina porous plate | Ni coat | ← | 96% |
| Example 7 | Alumina porous plate/2 mm | Alumina porous plate | Alumina porous plate Ni powder | Ni powder | 96% |
| Example 8 | Glass fiber/0.5 mm | SUS304-mesh | Needle-form Ni coat SUS304-mesh | Needle-form Ni coat | 96% |
| Example 9 | Glass fiber/0.5 mm | ETFE-mesh | Ni powder Ni coat | ← | 95% |
| Example 10 | PTFE porous membrane/55 μm | Ni porous body | ← | ← | 93% |
| Example 11 | Aluminum nitride film/230 nm | Pt-mesh | ← | ← | 95% |
| Example 12 | None/2 mm | INCOLOY 825 foil | Pt coat, INCOLOY 825 foil | Pt coat | 94% |
| Example 13 | None/20 mm | NSSC270 | NSSC270 Needle-form Ni coat | Needle-form Ni coat | 93% |
| Comparative Example 1 | None/Close adhesion | Ni porous body | ← | ← | 56% |
| Comparative Example 2 | None/Close adhesion | Al substrate | Al substrate Pt coat | Pt coat | 25% |

This application claims priority from Japanese Patent Application No. 2008-070702, filed Mar. 19, 2008, which is hereby incorporated by reference herein in its entirety.

What is claimed is:

1. A battery comprising:
   a positive electrode;
   a negative electrode having a capability of releasing a metal ion; and
   an inorganic solid electrolyte,
   wherein between the positive electrode and the inorganic solid electrolyte, there is
   1) one of a spacer material and a porous material, said porous material having a low reactivity with both the inorganic solid electrolyte and the positive electrode material, and
   2) a liquid that functions as both an electrolyte and an active ingredient, and wherein the positive electrode does not contact the inorganic solid electrolyte, and said spacer material or said porous material contacts both the positive electrode and the inorganic solid electrolyte directly, and
   when said porous material is between the positive electrode and the inorganic solid electrolyte, the distance between the positive electrode and the inorganic solid electrolyte is 55 µm to 2 mm, and
   when said spacer material is between the positive electrode and the inorganic solid electrolyte, the distance between the positive electrode and the inorganic solid electrolyte is between 2 mm and 100 mm,
   wherein the positive electrode has a catalytic material having a capability of reducing, and decomposing oxygen and/or water, and a current collecting unit having electron conductivity.

2. The battery according to claim 1, which has a spacer material between the positive electrode and the inorganic solid electrolyte.

3. The battery according to claim 1. which has a porous material between the positive electrode and the inorganic solid electrolyte.

4. The battery according to claim 3, wherein a porosity of the porous material is from 50 to 99%.

5. The battery according to claim 1, which contains no spacer material between the positive electrode and the inorganic solid electrolyte.

6. The battery according to claim 1 wherein the positive electrode has a capability of reducing and decomposing oxygen and/or water.

7. The battery according to claim 1, wherein the positive electrode has a porous body or mesh which holds a liquid electrolyte or causes the liquid electrolyte to flow, or a laminate of the porous body and the mesh.

8. The battery according to claim 1, wherein the positive electrode has a porosity of 20to 99.5%.

9. The battery according to claim 1, wherein at least a part of the current collecting unit of the positive electrode is coated with a metal.

10. The battery according to claim 1, wherein the current collecting unit of the positive electrode comprises a seawater-resistant alloy.

11. The battery according to claim 1, wherein the catalytic material of the positive electrode is made of time particles having an average particle diameter of 10 µm or less.

12. The battery according to claim 1, wherein the catalytic material of the positive electrode is made of fine particles having an aspect ratio of 2 or more.

13. The battery according to claim 1, wherein the positive electrode contains a catalytic material having a capability of reducing and decomposing oxygen and/or water, and the catalytic material has electron conductivity.

14. The battery according to claim 1, wherein the positive electrode has a thickness of 10 µm or more.

15. The battery according to claim 1, wherein the negative electrode contains lithium metal, 16. The battery according to claim 1, wherein the inorganic solid, electrolyte contains a crystal of $Li_{1+X+Z}Mx$ $(Ge_{1-Y}Ti_{Y2-X}P_{3-Z}Si_ZO_{12}$ where $0<X\leq0.6, 0.2\leq Y<0.8, 0<Z\leq1$, and M =Al or Ga.

17. A battery comprising:
   a positive electrode that does not contact the inorganic solid electrolyte and has a catalytic material having a capability of reducing and decomposing oxygen and/or water, and a current collecting unit having electron conductivity;
   a negative electrode having a capability of releasing a metal ion; and
   an inorganic solid electrolyte, wherein the inorganic solid electrolyte contains a crystal of $Li_{1+X+Z}Mx$ $(Ge_{1-Y}Ti_{Y2-X}P_{3-Z}Si_ZO_{12}$ where $0<X\leq0.6, 0.2\leq Y<0.8, 0<Z\leq1$, and M =Al or Ga,
   wherein between the positive electrode and the inorganic solid electrolyte, there is
   1) one of a spacer material and a porous material, said porous material having a low reactivity with both the inorganic solid electrolyte and the positive electrode material, and
   2) a liquid that functions as both an electrolyte and an active ingredient, and said spacer material or said porous material contacts both the positive electrode and the inorganic solid electrolyte directly,
   when said porous material is between the positive electrode and the inorganic solid electrolyte, the distance between the positive electrode and the inorganic solid electrolyte is 55 to 2 mm, and when said spacer material is between the positive electrode and the inorganic solid electrolyte, the distance between the positive electrode and the inorganic solid electrolyte is between 2 mm and 100 mm,
   wherein the positive electrode has a catalytic material having a capability of reducing and decomposing oxygen and/or water, and a current collecting unit having electron conductivity.

* * * * *